No. 873,929. PATENTED DEC. 17, 1907.
W. H. ECKMAN.
HORSE DETACHER.
APPLICATION FILED JUNE 6, 1907.
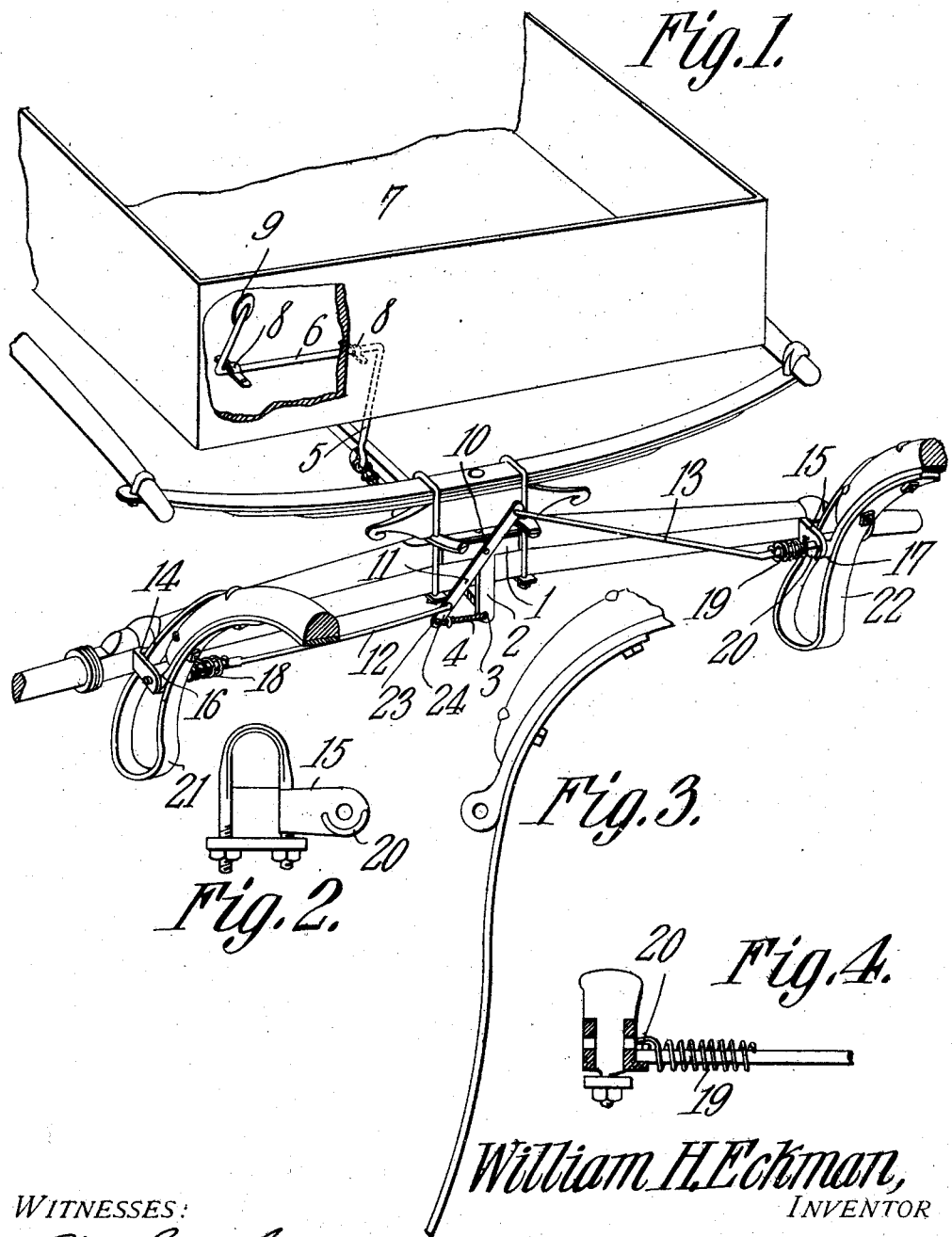
*William H. Eckman,*
INVENTOR
WITNESSES:
By
ATTORNEYS

UNITED STATES PATENT OFFICE.

WILLIAM H. ECKMAN, OF WARREN, INDIANA.

HORSE-DETACHER.

No. 873,929.   Specification of Letters Patent.   Patented Dec. 17, 1907.

Application filed June 6, 1907. Serial No. 377,599.

*To all whom it may concern:*

Be it known that I, WILLIAM H. ECKMAN, a citizen of the United States, residing at Warren, in the county of Huntington and State of Indiana, have invented a new and useful Horse-Detacher, of which the following is a specification.

My present invention relates to improvements in appliances of that character adapted for use on horse drawn vehicles whereby the horse may be quickly detached should it become uncontrollable, or in any other emergency, and it has for its object to provide an improved device of this character that is capable of operating positively for the purposes intended, and it also serves as a means for facilitating the attaching and detaching of the thills or poles to the vehicle.

Another object of the invention is to provide means for supporting the rear ends of the thills or pole at substantially the normal elevation in order that these parts may not strike upon the heels of the horse and thereby cause it to become frightened or injured.

To these and other ends, the invention comprises the various novel features of construction and combination and arrangement of parts, which will be hereinafter more fully described, and pointed out particularly in the appended claims.

In the accompanying drawings:—Figure 1 is a perspective view of a portion of a vehicle equipped with a horse detacher constructed in accordance with the present invention. Fig. 2 is a detail view of one of the axle clips. Fig. 3 is a detail view of the device employed for supporting the rear ends of the thills or poles after they have been detached from the vehicle. Fig. 4 is a detail view of a portion of the appliance showing one of the locking rods in unlocked position.

Corresponding parts in the several figures are indicated throughout by similar characters of reference.

In the present embodiment of the invention, the horse detacher is shown applied to an ordinary vehicle, it being understood, of course, that the device is capable of application generally to vehicles of various descriptions, and in the present instance it comprises an attaching plate 1 bolted or otherwise secured to the front axle of the vehicle, or a part movable therewith, the said plate having a downwardly extending arm 2 which preferably extends to a point slightly below the axle and is provided with a small pulley or eye 3 to receive an operating cord or other flexible connection 4, the latter having its rear end attached to a crank arm 5 which extends downwardly beyond the bottom of the vehicle and is attached to an operating shaft 6, the latter being journaled on a suitable part of the vehicle body, such as the floor 7, the bearings 8 serving to support it in operative position. The operating shaft is provided with an actuating device which is so arranged that it is immediately accessible to the driver or occupant of the vehicle, a treadle 9 being employed in the present instance which is arranged immediately below the driver's seat and in a position that will enable it to be readily manipulated by the foot, a pressure thereon serving to operate the cord 4.

The attaching plate 1 is provided with a pivot pin 10 which coöperates with an actuating lever 11 at a point intermediate of its ends, and connected to the latter at opposite sides of the pivot pin are a pair of locking rods 12 and 13 which extend in opposite directions toward the outer ends of the shaft. The ends of these rods are adapted to coöperate with the apertures in the axle clips 14 and 15, the latter having spaced lugs thereon to receive the coupling members 16 and 17 carried by the rear ends of the thills or the yoke of a pole, the coupling members being provided with apertures arranged to register with those of the axle clips and adapted to receive the outer ends of the respective locking rods which serve as pivot pins for connecting these parts.

In order to retain the locking rods in locked position under normal conditions and thereby prevent accidental disconnection of the thills from the vehicle, it is preferable to provide a pair of springs 18 and 19, those shown in the present instance being of a helical type and encircling the outer ends of the respective locking rods, the inner ends of the springs being fixed to the respective rods, and the outer ends thereof being attached to the axle clip, the action of the springs tending to move the locking rods into locked position. It is preferable to so arrange these springs that the end of one of the rods will be deflected laterally, that is to say, out of alinement with the respective apertures in the axle clips, so that when the thills are detached the locking rods will not return to locked position, for in such a case it would be difficult to return the thills to their proper position on the vehicle, and, in order to prevent displacement of the rods, it is preferable to provide a seat for the end of each rod after it has been moved to unlocked position, a flange 20 being formed on the inner side of each axle clip, in the present instance, which serves to retain the end of one of the rods in a position at one side of the apertures of its clip, and the other rod in alinement with the apertures of its clip, it being merely necessary to move the laterally displaced rod into alinement with the apertures of its respective clip when it is desirable to relock the thills to the vehicle, the tension of the springs 18 and 19 serving to automatically move the rods into locked position.

It is preferable to provide suitable means for supporting the rear ends of the thills or pole after they have been detached from the vehicle, in order that the horse may not be frightened thereby, the devices shown in the present instance for accomplishing this purpose comprising a pair of resilient arms 21 and 22 composed of spring steel or other suitable material and having one end rigidly attached in a suitable way to the rear ends of the thills, the opposite end of each spring being passed between the lugs of the respective axle clips so as to double the arms and thus shorten their length so as not to form an obstruction, the spring arms being of a length substantially equal to the normal height of the rear ends of the shafts above the ground, so that when the thills are detached they will engage the ground or pavement and constitute yielding supports for the thills that will serve to keep them off the heels of the horse. These spring arms also serve to prevent rattling between the thills and their attaching clips.

The operating cord 4 is attached to the actuating lever 11 at a suitable point, it being attached in the present instance to the eye 23 formed on an extension 24 at the lower end thereof, and, whenever it is necessary to detach the thills, the treadle 9 is depressed by the foot of the driver or other occupant of the vehicle, the tension thus produced upon the operating cord 4 causing it to turn the lever 11 above its pivot, the locking rods being simultaneously drawn toward the center of the axle a distance sufficient to disengage their outer ends from the respective axle clips, the springs serving to depress them laterally into engagement with the respective flanges or projections 20. After the locking rods have been withdrawn from the apertures of the axle clips, the coupling members on the thills will disengage from the clips, so that the horse no longer has control of the vehicle, although the rear ends of the thills will be supported by means of the resilient arms which immediately straighten out to their full lengths and rest upon the ground.

A safety appliance of the character described constructed in accordance with the present invention is capable of being readily applied to vehicles of various constructions, and, in practice, it serves to positively disconnect the thills from the remainder of the vehicle, the releasing treadle being arranged within convenient reach of the driver so that it may be operated while the hands of the driver are free to manage the reins. Moreover, the device is so constructed that it may serve as means for facilitating the connecting and disconnecting of thills and poles relatively to the vehicle, as both couplings are disconnected simultaneously by the operation of a single part, and relocking of the parts may be readily accomplished.

What is claimed is:—

1. In a device of the character described, the combination with the axle clips and coöperating coupling members, of a pair of locking rods having their outer ends adapted to coöperate with the clips and coupling members, springs normally acting to move the rods to locked position, and means on one of the clips for retaining both rods in unlocked position.

2. In a device of the character described, the combination with the axle clips and coöperating coupling members, of a pair of operatively connected locking rods arranged to coöperate with the respective clips and coupling members to simultaneously lock and unlock them, and means on one of the clips coöperating with one of the rods for retaining both of them in unlocked position.

3. In a device of the character described, the combination with axle clips having inwardly extending flanges upon their proximate sides, one of the flanges being offset laterally of the pivot receiving apertures of its respective clip, and coupling members adapted to coöperate with the axle clips, of a pair of locking rods operatively connected and having their ends arranged to coöperate with the respective clips, one of the rod ends coöperating with the relatively offset flange as a seat for retaining both rods in unlocked position, and means normally acting to move the rods into locked position.

4. In a device of the character described, the combination with an attaching plate adapted to be secured to a vehicle axle and provided with a depending arm having a guiding device at its lower end, a pair of axle clips arranged at opposite sides of the attaching plate, and coupling members adapted to coöperate with the axle clips, of a pair of locking rods mounted in coöperative relation with the clips, a device on one of the latter for retaining the rods in unlocked position, an actuating lever pivotally connected to the attaching plate and having its opposite ends operatively connected to the respective locking rods, an operating cord connected to the actuating lever and coöperating with the guide on the lower end of the said arm, and a treadle adapted to be mounted beneath the vehicle seat and connected to the operating cord.

5. In a mechanism of the character described, the combination with the axle clips and thills adapted to be detachably coupled thereto, of supporting devices for the rear ends of the vehicle thills embodying strips of resilient material having their upper ends rigidly attached to the thills and their other ends unattached and having a normal tendency to straighten out, said strips being capable of being doubled longitudinally against their normal tendency and to be then extended through the axle clips when the thills are coupled thereto.

6. In a device of the character described, the combination with the axle clips and coöperating coupling members for connecting the thills or pole to the vehicle, of a pair of resilient arms having one end rigidly attached to the thills or pole, each arm having a normal tendency to straighten out and capable of being doubled up to engage the respective clip.

7. In a device of the character described, the combination with the axle clips and coupling members adapted to coöperate therewith for connecting the thills or pole to a vehicle, and means for connecting and disconnecting the coupling members relatively to the clips, of a pair of spring arms each having one end rigidly attached to a portion of the thills or pole and having a normal tendency to straighten out, each of said arms being capable of being doubled up, so that the opposite or free end may be inserted between the pivot lugs of the coöperating axle clip.

8. In a device of the character described, spring arms fixed at one end to a portion of vehicle thills or a vehicle pole, said spring arms having a normal tendency to straighten out and capable of being bent on themselves against their spring action for the insertion of the free end of the arms in axle clips.

In testimony that I claim the foregoing as my own, I have hereto affixed my signature in the presence of two witnesses.

WILLIAM H. ECKMAN.

Witnesses:
   FRANCIS I. STULTS,
   GEO. W. SOUERS.